US011448127B2

(12) United States Patent
Nestico et al.

(10) Patent No.: US 11,448,127 B2
(45) Date of Patent: Sep. 20, 2022

(54) TRANSLATING INLET FOR ADJUSTING AIRFLOW DISTORTION IN GAS TURBINE ENGINE

(71) Applicant: General Electric Company, Schenectady, NY (US)

(72) Inventors: Brian Francis Nestico, Loveland, OH (US); Brian K. Kestner, Cincinnati, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/928,056

(22) Filed: Jul. 14, 2020

(65) Prior Publication Data

US 2020/0340401 A1    Oct. 29, 2020

Related U.S. Application Data

(62) Division of application No. 15/085,047, filed on Mar. 30, 2016, now Pat. No. 10,753,278.

(51) Int. Cl.
*F02C 7/00*         (2006.01)
*F02C 7/057*        (2006.01)
(Continued)

(52) U.S. Cl.
CPC .............. *F02C 7/057* (2013.01); *F02C 3/04* (2013.01); *F02C 7/042* (2013.01); *F02C 9/20* (2013.01);
(Continued)

(58) Field of Classification Search
None
See application file for complete search history.

(56) References Cited

U.S. PATENT DOCUMENTS 2,604,278 A    7/1952    Johnson
2,857,092 A    10/1958   Campbell
(Continued)

FOREIGN PATENT DOCUMENTS

CN    1654804 A    8/2005
CN    1975130 A    6/2007
(Continued)

OTHER PUBLICATIONS

Kaili Liu et al, Numerical Investigation on Engine Inlet Distortion Under Crosswind for a Commercial Transport Aircraft, 2014 (Year: 2014).*

(Continued)

*Primary Examiner* — Edwin Kang
(74) *Attorney, Agent, or Firm* — Dority & Manning, P.A.

(57) ABSTRACT

Systems and methods for adjusting airflow distortion in a gas turbine engine using a translating inlet assembly are provided. In one embodiment, a core engine of a gas turbine engine can include a compressor section, a combustion section, and a turbine section in series flow and defining at least in part an engine airflow path. The compressor section can include an inner flowpath surface. A core casing can enclose the core engine. A forward end of the core casing can include a translating inlet assembly moveable between a first position and a second position. The translating inlet assembly and the inner flowpath surface can together define an inlet to an engine airflow path. A translating inlet assembly can define a first inlet area in the first position and a second inlet area in the second position, the first inlet area being greater than the second inlet area.

16 Claims, 8 Drawing Sheets

(51) Int. Cl.
*F04D 27/02* (2006.01)
*F02C 9/20* (2006.01)
*F02K 3/075* (2006.01)
*F02C 3/04* (2006.01)
*F02C 7/042* (2006.01)

(52) U.S. Cl.
CPC .......... *F02K 3/075* (2013.01); *F04D 27/0253* (2013.01); *F05D 2270/101* (2013.01)

(56) References Cited

U.S. PATENT DOCUMENTS

| | | | |
|---|---|---|---|
| 3,222,863 A * | 12/1965 | Klees | F02C 7/042 138/43 |
| 3,392,585 A | 7/1968 | Bentz et al. | |
| 3,677,000 A | 7/1972 | Thomson | |
| 4,075,833 A | 2/1978 | Sargisson | |
| 4,163,365 A | 8/1979 | Frutschi | |
| 4,214,440 A | 7/1980 | Rücker | |
| 4,546,605 A | 10/1985 | Mortimer et al. | |
| 4,852,343 A | 8/1989 | Norris et al. | |
| 5,076,052 A | 12/1991 | Wildner | |
| 5,230,603 A | 7/1993 | Day | |
| 5,284,012 A | 2/1994 | Laborie et al. | |
| 5,448,881 A | 9/1995 | Patterson et al. | |
| 5,782,603 A | 7/1998 | O'Brien et al. | |
| 6,169,496 B1 | 1/2001 | Martin et al. | |
| 6,231,306 B1 | 5/2001 | Khalid | |
| 6,582,183 B2 | 6/2003 | Eveker | |
| 6,901,739 B2 | 6/2005 | Christopherson | |
| 7,299,621 B2 | 11/2007 | Bart et al. | |
| 7,326,027 B1 | 2/2008 | Skoch et al. | |
| 7,637,455 B2 | 12/2009 | Silkey et al. | |
| 7,730,714 B2 | 6/2010 | Wood et al. | |
| 7,811,049 B2 | 10/2010 | Xu | |
| 7,811,050 B2 | 10/2010 | Roth | |
| 7,827,803 B1 | 11/2010 | Wadia et al. | |
| 7,861,578 B2 | 1/2011 | Adibhatla et al. | |
| 7,891,163 B2 | 2/2011 | Richards | |
| 8,313,280 B2 | 11/2012 | Hurwitz et al. | |
| 8,478,473 B2 | 7/2013 | Adibhatla | |
| 8,514,103 B2 | 8/2013 | Maris | |
| 8,550,767 B2 | 10/2013 | Horn et al. | |
| 8,641,367 B2 | 2/2014 | Norris et al. | |
| 8,740,548 B2 | 6/2014 | Rowe et al. | |
| 8,820,090 B2 | 9/2014 | Lee et al. | |
| 8,844,553 B2 | 9/2014 | Zysman et al. | |
| 9,194,301 B2 | 11/2015 | Parente | |
| 9,482,236 B2 | 11/2016 | Khalid et al. | |
| 9,777,633 B1 | 10/2017 | Nestico et al. | |
| 10,502,089 B2 | 12/2019 | Cheng et al. | |
| 2003/0035719 A1 | 2/2003 | Wadia et al. | |
| 2009/0003997 A1 | 1/2009 | Jain et al. | |
| 2009/0169367 A1 | 7/2009 | Wadia et al. | |
| 2009/0297334 A1 * | 12/2009 | Norris | F02C 9/22 415/49 |
| 2010/0023238 A1 | 1/2010 | Adibhatla | |
| 2010/0024536 A1 | 2/2010 | Adibhatla et al. | |
| 2010/0040453 A1 | 2/2010 | Vo | |
| 2010/0329851 A1 | 12/2010 | Nilsson | |
| 2011/0056210 A1 * | 3/2011 | Griffin | F04D 27/0223 60/773 |
| 2011/0176913 A1 | 7/2011 | Wassynger et al. | |
| 2013/0103323 A1 | 4/2013 | Snider et al. | |
| 2013/0319009 A1 | 12/2013 | Parente | |
| 2013/0319099 A1 | 12/2013 | Kishino et al. | |
| 2014/0013765 A1 | 1/2014 | Studerus et al. | |
| 2014/0026588 A1 | 1/2014 | Velez | |
| 2014/0075956 A1 | 3/2014 | Patsouris | |
| 2014/0083176 A1 | 3/2014 | Rhoden | |
| 2014/0093350 A1 | 4/2014 | Meisner et al. | |
| 2014/0130513 A1 * | 5/2014 | Chiu | F02C 3/06 60/805 |
| 2014/0169948 A1 | 6/2014 | Kay et al. | |
| 2014/0182292 A1 | 7/2014 | Hudon et al. | |
| 2014/0303832 A1 | 10/2014 | Skertic | |
| 2015/0040573 A1 * | 2/2015 | Ferreira-Providakis | F02C 9/20 60/772 |
| 2015/0369137 A1 * | 12/2015 | Engler | F02C 9/22 60/773 |
| 2016/0130973 A1 * | 5/2016 | Pachidis | F01D 17/162 415/148 |
| 2016/0131145 A1 | 5/2016 | Mohtar et al. | |
| 2016/0195012 A1 * | 7/2016 | Olivier | B64C 11/38 415/122.1 |
| 2016/0237910 A1 | 8/2016 | Saito et al. | |
| 2016/0326903 A1 | 11/2016 | Xu | |
| 2016/0348531 A1 | 12/2016 | Rice et al. | |
| 2017/0218841 A1 | 8/2017 | Nestico et al. | |
| 2017/0218842 A1 | 8/2017 | Nestico et al. | |
| 2017/0218854 A1 | 8/2017 | Nestico et al. | |
| 2017/0284296 A1 | 10/2017 | Nestico et al. | |
| 2017/0284297 A1 | 10/2017 | Nestico et al. | |
| 2017/0284304 A1 | 10/2017 | Nestico et al. | |

FOREIGN PATENT DOCUMENTS

| | | |
|---|---|---|
| CN | 104619958 A | 5/2015 |
| DE | 3333437 A1 | 4/1985 |
| EP | 0628727 B1 | 12/1994 |
| EP | 1522710 A2 | 4/2005 |
| EP | 1942259 A2 | 7/2008 |
| EP | 2713015 A2 | 4/2014 |
| EP | 2998522 A2 | 3/2016 |
| EP | 3225815 A1 | 10/2017 |
| FR | 3004749 A1 | 10/2014 |
| GB | 867849 A | 5/1961 |
| GB | 1238897 A | 7/1971 |
| GB | 2005356 A | 4/1979 |
| GB | 2294094 A | 4/1996 |
| GB | 2452026 A | 2/2009 |
| JP | S5756699 A | 4/1982 |
| JP | S5859399 A | 4/1983 |
| JP | S59196929 A | 8/1984 |
| JP | 2010/031841 A | 2/2010 |
| JP | 2010/031842 A | 2/2010 |
| JP | 2010/534787 A | 11/2010 |
| JP | WO2015064428 A1 | 3/2017 |
| JP | 2017/180459 A | 10/2017 |
| WO | WO2015/064428 A1 | 5/2015 |

OTHER PUBLICATIONS

Colin et al, Numerical Simulation and Analysis of Crosswind Inlet Flows at Low Mach numbers, 2007 (Year: 2007).*
Canadian Office Action Corresponding to CA2955539 dated Dec. 20, 2017.
Canadian Office Action Corresponding to CA2955461 dated Dec. 28, 2017.
Machine Translation and First Canadian Office Action and Search Corresponding to CN2955395 dated Jan. 31, 2018.
Machine Translation and Canadian Office Action and Search Corresponding to CA2960906 dated Feb. 9, 2018.
Canadian Office Action Corresponding to CA2960920 dated Apr. 30, 2018.
Canadian Office Action Corresponding to CA2955461 dated Aug. 7, 2018.
Canadian Office Action Corresponding to CA2960920 dated Jan. 31, 2019.
Machine Translation and First Chinese Office Action and Search Corresponding to CN201710056310.9 dated Jan. 22, 2018.
Chinese Office Action Corresponding to CN2017100561654 dated Feb. 2, 2018.
Machine Translation and First Chinese Office Action and Search Report Corresponding to CN201710201951.9 dated Aug. 2, 2018.
Chinese Office Action Corresponding to CN201710056206X dated Aug. 28, 2018.
Chinese Office Action Corresponding to CN2017100561654 dated Nov. 5, 2018.

(56) References Cited

OTHER PUBLICATIONS

Chinese Office Action Corresponding to CN2017102019519 dated Feb. 26, 2019.
Chinese Office Action Corresponding to CN2017102051497 dated May 7, 2019.
Chinese Office Action Corresponding to CN201710056206X dated May 15, 2019.
Chinese Office Action Corresponding to CN2017100561654 dated Jun. 4, 2019.
Chinese Office Action Corresponding to CN201710201951.9 dated Jul. 31, 2019.
European Search Report Corresponding to EP171529209 dated Jun. 2, 2017.
European Search Report Corresponding to EP17153589.1 dated Jun. 8, 2017.
European Search Report Corresponding to EP171538895 dated Jul. 17, 2017.
European Search Report Corresponding to EP17163223.5 dated Aug. 7, 2017.
European Search Report Corresponding to EP17163219.3 dated Aug. 11, 2017.
European Search Report Corresponding to EP171632219 dated Aug. 22, 2017.
European Office Action Corresponding to EP171529209 dated Sep. 21, 2018.
European Office Action Corresponding to EP171632235 dated Apr. 2, 2019.
European Office Action Corresponding to EP171529209 dated Jul. 1, 2019.
Japanese Office Action Corresponding to JP2017-009052 dated Feb. 20, 2018.
Machine Translation and Japanese Notification of Reasons for Refusal Corresponding to JP2017-009053 dated Feb. 20, 2018.
Machine Translation and Japanese Notifications of Reasons for Refusal Corresponding to JP2017/052026 dated Apr. 27, 2018.
Machine Translation and Japanese Notification of Reasons for Refusal Corresponding to JP2017-050699 dated May 15, 2018.
Japanese Office Action Corresponding to JP2017050699 dated Dec. 4, 2018.
Cotta Transmission Company LLC, Technical: Efficiency and Heat Rejection http://www.cotta.com/efficiency-and-heat-rejection.
Kampf, Why Do Turbofan Engines Have Low Pressure Compressors, Aviation Stack Exchange, Sep. 7, 2015.
NASA, Static Pressure Measurement, Mar. 1, 2014, 2 Pages.

\* cited by examiner

TRANSLATING INLET FOR ADJUSTING AIRFLOW DISTORTION IN GAS TURBINE ENGINE

CROSS REFERENCE TO RELATED APPLICATION

This Application is a divisional of U.S. patent application Ser. No. 15/085,047 entitled "TRANSLATING INLET FOR ADJUSTING AIRFLOW DISTORTION IN GAS TURBINE ENGINE", filed Mar. 30, 2016, which is incorporated herein by reference.

FIELD OF THE INVENTION

The present subject matter relates generally to gas turbine engines and more particularly to a translating inlet for adjusting airflow distortion in a gas turbine engine.

BACKGROUND OF THE INVENTION

A gas turbine engine generally includes a core having, in serial flow order, a compressor section, a combustion section, a turbine section, and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the compressor section and is then routed through the exhaust section, e.g., to atmosphere.

During operation, the gas turbine engine may encounter airflow distortion in the engine airflow path upstream of the compressor section, such as a circumferential or local flow disruption due to the angle of attack of the gas turbine engine, a cross wind, or any other inlet anomaly. Airflow distortion can be so uneven during operation as to put portions of the compressor section at or below proper stall pressure ratios. In many cases, sufficient stall margin should be maintained in the compressor section in order to prevent stall conditions from occurring during operation of the gas turbine engine.

One approach to maintaining a desired stall margin in a gas turbine engine is to close the variable guide vanes at the inlet to the compressor section, thereby reducing air flow and pressure in the compressor section below a pressure sufficient to cause stall conditions. However, closing the variable guide vanes can decrease the overall efficiency of the gas turbine engine.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a core engine of a gas turbine engine. The core engine can include a compressor section, a combustion section, and a turbine section in series flow and defining at least in part an engine airflow path for the gas turbine engine. The core engine can also include an inner flowpath surface positioned at least partially within the compressor section and defining at least in part the engine airflow path. The core engine can also include a core casing at least partially enclosing the compressor section and defining a forward end. The core casing can include a translating inlet assembly at the forward end. The translating inlet assembly and inner flowpath surface can together define an inlet to the compressor section. The translating inlet assembly can be moveable between a first position defining a first inlet area at the inlet and a second position defining a second inlet area at the inlet, with the first inlet area being greater than the second inlet area.

Another example aspect of the present disclosure is directed to a method for adjusting airflow distortion in a gas turbine engine. The gas turbine engine can include a compressor section, a combustion section, and a turbine section in series flow. The compressor section, combustion section, and turbine section can define at least in part an engine airflow path. The gas turbine engine can include an inner flow path surface positioned at least partially within the compressor section and defining at least in part the engine airflow path. The gas turbine engine can include a core casing at least partially enclosing the compressor section and defining a forward end. The method includes determining, by one or more control devices, an airflow distortion condition associated with the engine airflow path. The method can also include controlling, by the one or more control devices, a translating inlet assembly to adjust the airflow distortion condition of the gas turbine engine. The core casing can include the translating inlet assembly at the forward end. The translating inlet assembly and inner flow path surface can together define an inlet to the compressor section. The translating inlet assembly can be moveable between a first position defining a first inlet area and a second position defining a second inlet area, with the first inlet area being greater than the second inlet area.

Other example aspects of the present disclosure are directed to gas turbine engines, devices, apparatus, and other systems configured to adjust airflow distortion in the airflow path of a gas turbine engine. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
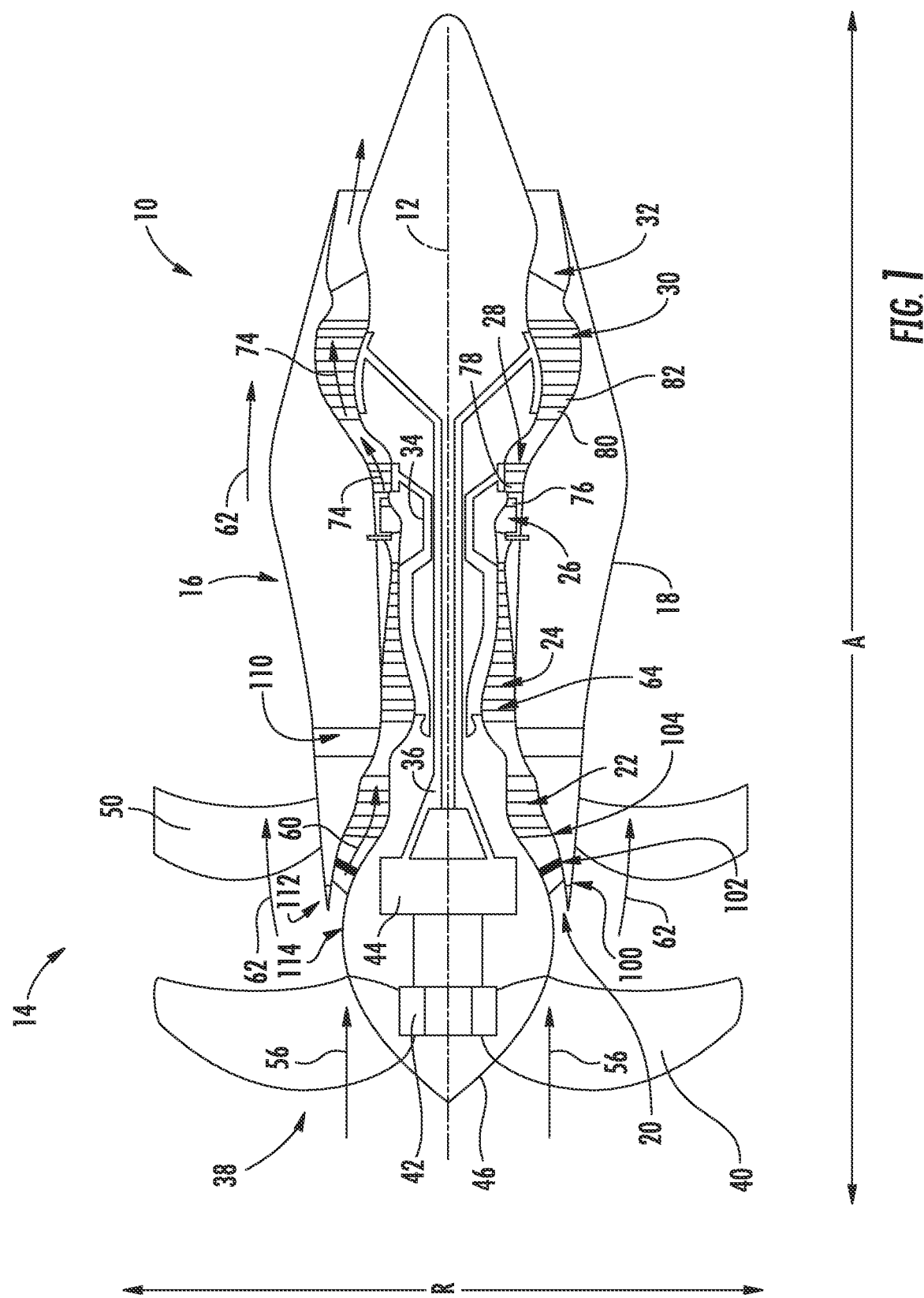
FIG. 1 is a schematic, cross-sectional view of a gas turbine engine according to example embodiments of the present subject matter.

Reference now will be made in detail to embodiments of the present disclosure, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the present disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to adjusting airflow distortion in a gas turbine engine in real-time. Airflow distortion can be so uneven during operation of the gas turbine engine as to put portions of the compressor section at or below proper stall pressure ratios, thereby reducing the operability of the gas turbine engine. Increased stall margin headroom can therefore be necessary to account for airflow distortion.

The gas turbine engine and method according to example aspects of the present disclosure can increase the operability of the aircraft's gas turbine engine by making a real-time assessment of airflow distortion in the engine airflow path of the gas turbine engine and adjusting the airflow distortion in the engine airflow path by operating a translating inlet assembly to vary the amount and/or speed of airflow into the engine airflow path of the gas turbine engine based on the airflow distortion assessment. Real-time pressure measurements obtained from the engine airflow path can be used to make an assessment of airflow distortion conditions in the gas turbine engine. Airflow distortion in the engine airflow path can then be adjusted by opening or closing the translating inlet assembly to increase or decrease the amount of airflow and/or airflow speed into the engine airflow path. By adjusting the airflow distortion in the engine airflow path, the operability of the gas turbine engine can be improved.

According to particular aspects of the present disclosure, a translating inlet assembly can be used to vary the amount and/or speed of airflow entering the engine airflow path in a gas turbine engine in response to airflow distortion in the engine airflow path. The gas turbine engine can include a compressor section, a combustion section, and a turbine section series flow and enclosed by a casing. The gas turbine engine can include a translating inlet assembly at a forward end of the casing. An engine airflow can enter the gas turbine engine through an inlet to the compressor section between a front edge of the translating inlet assembly and an inner flowpath surface. The engine airflow can then flow through the engine airflow path of the gas turbine engine. The front edge of the translating inlet assembly can be configured to move between a first position and a second position in order to vary the area of the inlet to the compressor section. For example, in an embodiment, the front edge of the translating inlet assembly can move generally along an axial direction in order to increase or decrease the inlet area about the circumference of the inlet of the compressor section of the gas turbine engine. In another embodiment, the front edge of the translating inlet assembly can move between a first position and a second position such that the front edge of the translating inlet assembly translates at least partially along a radial direction to increase or decrease the inlet area. In an embodiment, the translating inlet assembly can move between the first position and the second position in a generally uniform manner about the circumference of the gas turbine engine such that the inlet area of the compressor section is generally uniform about the entire circumference of the inlet. In another embodiment, the translating inlet assembly can move to one or more intermediate positions such that the inlet area in the one or more intermediate positions is less than the inlet area in the first position and more than the inlet area in the second position.

In an embodiment, the translating inlet assembly can be configured to be controlled to move between positions in response to airflow distortion. For example, in one embodiment, one or more pressure sensing devices can be integrated into various components that extend into the engine airflow path of the gas turbine engine. A distortion condition assessment can be made based on the real-time pressure measurements obtained from the pressure sensing devices. For example, a non-uniform pressure profile across the engine airflow path can indicate that airflow distortion is present in the engine airflow path. The translating inlet assembly can then be controlled to adjust the airflow distortion associated with the engine airflow path. For example, the translating inlet assembly can be controlled to increase or reduce the inlet area of the compressor section to allow or restrict airflow into the engine airflow path, thereby reducing the airflow distortion.

In this way, the gas turbine engine and method according to example aspects of the present disclosure can have a technical effect of adjusting the airflow distortion of the gas turbine engine based on real-time airflow distortion conditions. Further, this can allow an increase in the operability of the gas turbine engine by increasing the stall margin headroom available for operational safety.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an example embodiment of the present disclosure. More particularly, for the embodiment of FIG. 1, the gas turbine engine is a high-bypass turbofan jet engine 10, referred to herein as "gas turbine engine 10." Example aspects of the present disclosure can be used with other suitable gas turbine engines without deviating from the scope of the present disclosure.

As shown in FIG. 1, the gas turbine engine 10 defines an axial direction A (extending parallel to a longitudinal centerline 12 provided for reference) and a radial direction R. The gas turbine engine 10 also defines a circumferential direction (not depicted). In general, the gas turbine engine 10 includes a fan section 14 and a core engine 16, the fan section 14 configured in mechanical communication and positioned in flow communication with the core engine 16.

The example core engine 16 depicted generally includes a substantially tubular outer casing 18 which defines a forward end that includes a translating inlet assembly 112. Translating inlet assembly 112 and an inner flowpath surface 114 together define an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal centerline 12 by LP shaft 36 across a power gear box 44. The power gear box 44 includes a plurality of gears for adjusting the rotational speed of the LP shaft 36. Additionally, for the embodiment depicted, the disk 42 of the variable pitch fan 38 is covered by a rotatable front hub 46 aerodynamically contoured to promote an airflow through the plurality of fan blades 40.

Referring still to FIG. 1, the example gas turbine engine 10 additionally includes a plurality of circumferentially-spaced outlet guide vanes 50. The plurality of outlet guide vanes 50 are positioned downstream from the fan 38 along the axial direction A and extend outwardly from the outer casing 18 of the core engine 16 generally along the radial direction R. Each outlet guide vane 50 defines a center of pressure 52 (shown in FIG. 2) and a pitch axis P extending substantially parallel to the radial direction R. Notably, for the embodiment depicted, the gas turbine engine 10 does not include any outer casing enclosing the fan section 14 and/or outlet guide vanes 50. Accordingly, for the embodiment depicted, the gas turbine engine 10 may be referred to as an un-ducted single fan gas turbine engine 10.

For the example gas turbine engine 10 depicted, the fan section 14, or more particularly, the rotation of the fan blades 40 of the fan section 14, provides a majority of the propulsive thrust of the gas turbine engine 10. Additionally, the plurality of outlet guide vanes 50 are provided to increase an efficiency of the fan section 14 as well as to provide other benefits, such as, for example, decreasing an amount of noise generated by the gas turbine engine 10.

During operation of the gas turbine engine 10, a volume of air 56 passes over the plurality of blades 40 of the fan section 14. A first portion of the volume of air 56, i.e., the first portion of air 60, is directed or routed through annular inlet 20 into an engine airflow path 64 extending through the compressor section, the combustion section 26, the turbine section, and the exhaust section 32. The first portion of air 60 may also be referred to as an engine airflow. Additionally, a second portion of the volume of air 56, e.g., a second portion of air 62, flows around the core engine 16, bypassing the core engine 16. The second portion of air 62 may also be referred to as a bypass airflow. The ratio between the second portion of air 62 and the first portion of air 60 is commonly known as a bypass ratio.

Referring still to FIG. 1, the pressure of the first portion of air 60 is increased as it is routed through the LP compressor 22 and subsequently through the HP compressor 24. The compressed first portion of air 60 is then provided to the combustion section 26, where it is mixed with fuel and burned to provide combustion gases 74. The combustion gases 74 are routed through the HP turbine 28 where a portion of thermal and/or kinetic energy from the combustion gases 74 is extracted via sequential stages of HP turbine stator vanes 76 that are coupled to the outer casing 18 and HP turbine rotor blades 78 that are coupled to the HP shaft or spool 34, thus causing the HP shaft or spool 34 to rotate, thereby supporting operation of the HP compressor 24. The combustion gases 74 are then routed through the LP turbine 30 where a second portion of thermal and kinetic energy is extracted from the combustion gases 74 via sequential stages of LP turbine stator vanes 80 that are coupled to the outer casing 18 and LP turbine rotor blades 82 that are coupled to the LP shaft or spool 36, thus causing the LP shaft or spool 36 to rotate, thereby supporting operation of the LP compressor 22 and/or rotation of the fan 38. The combustion gases 74 are subsequently routed through the jet exhaust nozzle section 32 of the core engine 16 to provide propulsive thrust to supplement propulsive thrust provided by the fan section 14.

Referring still to FIG. 1, downstream of an annular inlet 20 is one or more inlet guide vanes 100. In certain example embodiments, inlet guide vane 100 may be configured to open or close, thereby restricting the flow of the first portion of air 60 into the engine airflow path 64 extending through the compressor section. In certain example embodiments, inlet guide vane 100 can be an instrumented guide vane 400 according to example embodiments of the present disclosure as depicted, for instance, in FIGS. 8 and 9.

Downstream of inlet guide vane 100 is one or more struts 102 configured to mechanically couple outer casing 18 to the core engine 16. Strut 102 extends into the engine airflow path 64 where first portion of air 60 flows over strut 102. In certain example embodiments, strut 102 is configured to obtain pressure measurements. Downstream of strut 102 is one or more variable guide vanes 104. Variable guide vanes 104 are configured to open or close, thereby restricting the flow of the first portion of air 60 into the engine airflow path 64 extending through the compressor section. In certain example embodiments, variable guide vane 104 can be an instrumented variable guide vane 400 according to example embodiments of the present disclosure as shown, for instance, in FIGS. 8 and 9.

Figure 2:
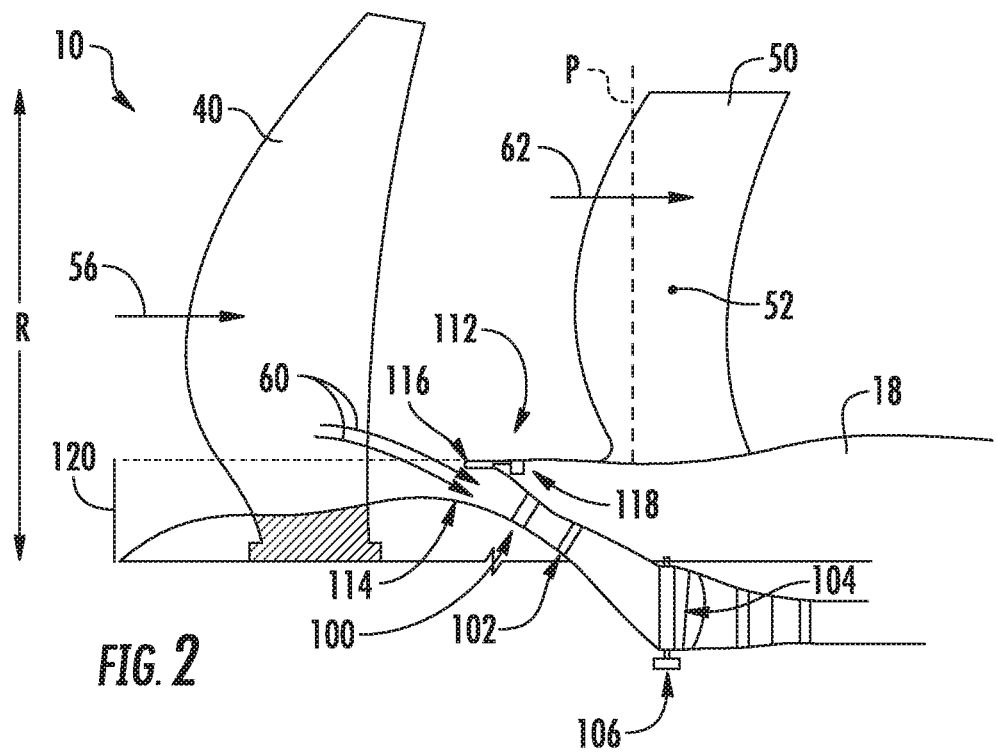
FIG. 2 is schematic, cross-sectional view of a forward end of an example gas turbine engine according to example embodiments of the present disclosure.
Figure 3:
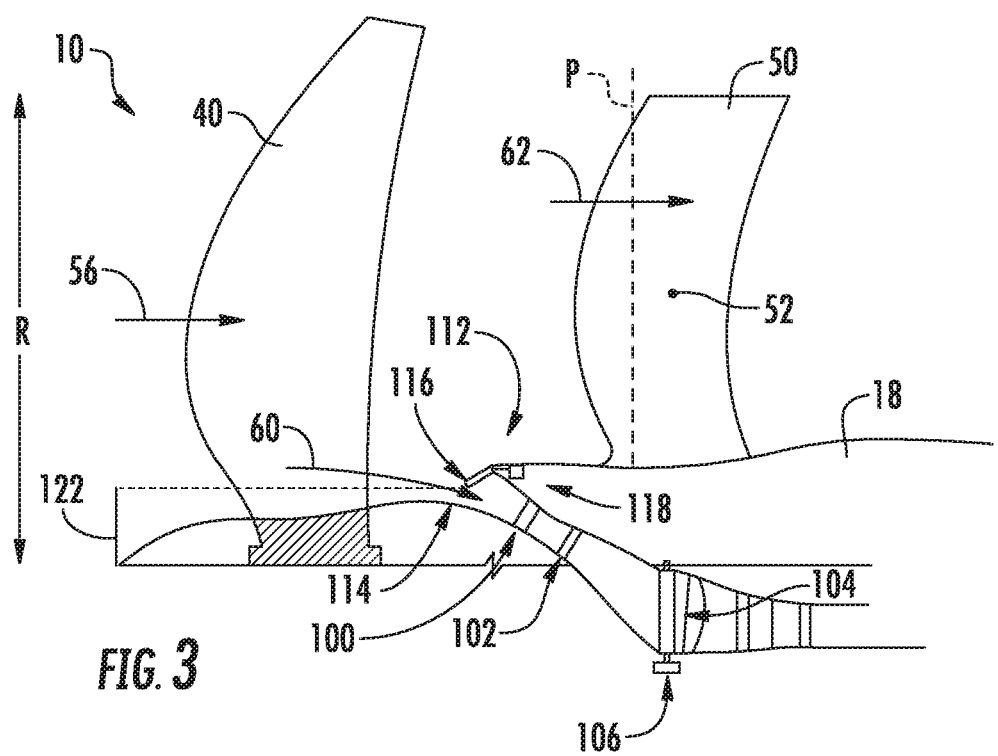
FIG. 3 is schematic, cross-sectional view of a forward end of an example gas turbine engine according to example embodiments of the present disclosure.

Referring now to FIGS. 2 and 3, a close-up, cross-sectional view of the forward end of the example gas turbine engine 10 of FIG. 1 according to example aspects of the present disclosure is shown. As shown, the gas turbine engine 10 includes at least one control mechanism 106 configured to adjust a variable guide vane 104. In certain example embodiments, the gas turbine engine 10 may include a plurality of control mechanisms 106, each individual control mechanism 106 configured to adjust an individual variable guide vane 104 or other member of the airflow path.

Referring still to FIGS. 2 and 3, translating inlet assembly 112 is located on the forward end of outer casing 18. As shown in FIGS. 2 and 3, core engine 16 can include an inner flowpath surface 114. Translating inlet assembly 112 can include a front edge 116 which can be moved by one or more actuators 118. In an embodiment, a plurality of actuators 118 can be spaced about the circumferential direction of gas turbine engine 10 to move front edge 116. Together, front edge 116 and inner flowpath surface 114 can define annular inlet 20, as shown in FIG. 1.

As illustrated in FIGS. 2 and 3, in some embodiments, front edge 116 can be moved at least partially along radial direction R between a first position and a second position. For example, as shown in FIG. 2, front edge 116 is in a first position such that front edge 116 defines a first radius 120. As shown in FIG. 3, front edge 116 is in a second position such that front edge 116 defines a second radius 122. As depicted in FIGS. 2 and 3, first radius 120 is greater than second radius 122.

As depicted in FIGS. 2 and 3, first portion of air 60 enters core engine 16 by passing between front edge 116 and inner flowpath surface 114. As depicted in FIGS. 2 and 3, front edge 116 in the first position allows an increased first portion of air 60 to enter engine flowpath 64 as compared to front edge 116 in the second position. In another embodiment not shown in FIGS. 2 and 3, front edge 116 can be moved to one or more intermediate positions such that the first portion of air 60 in the intermediate position is less than the first portion of air 60 in the first position and more than the first portion of air 60 in the second position.

Figure 10:
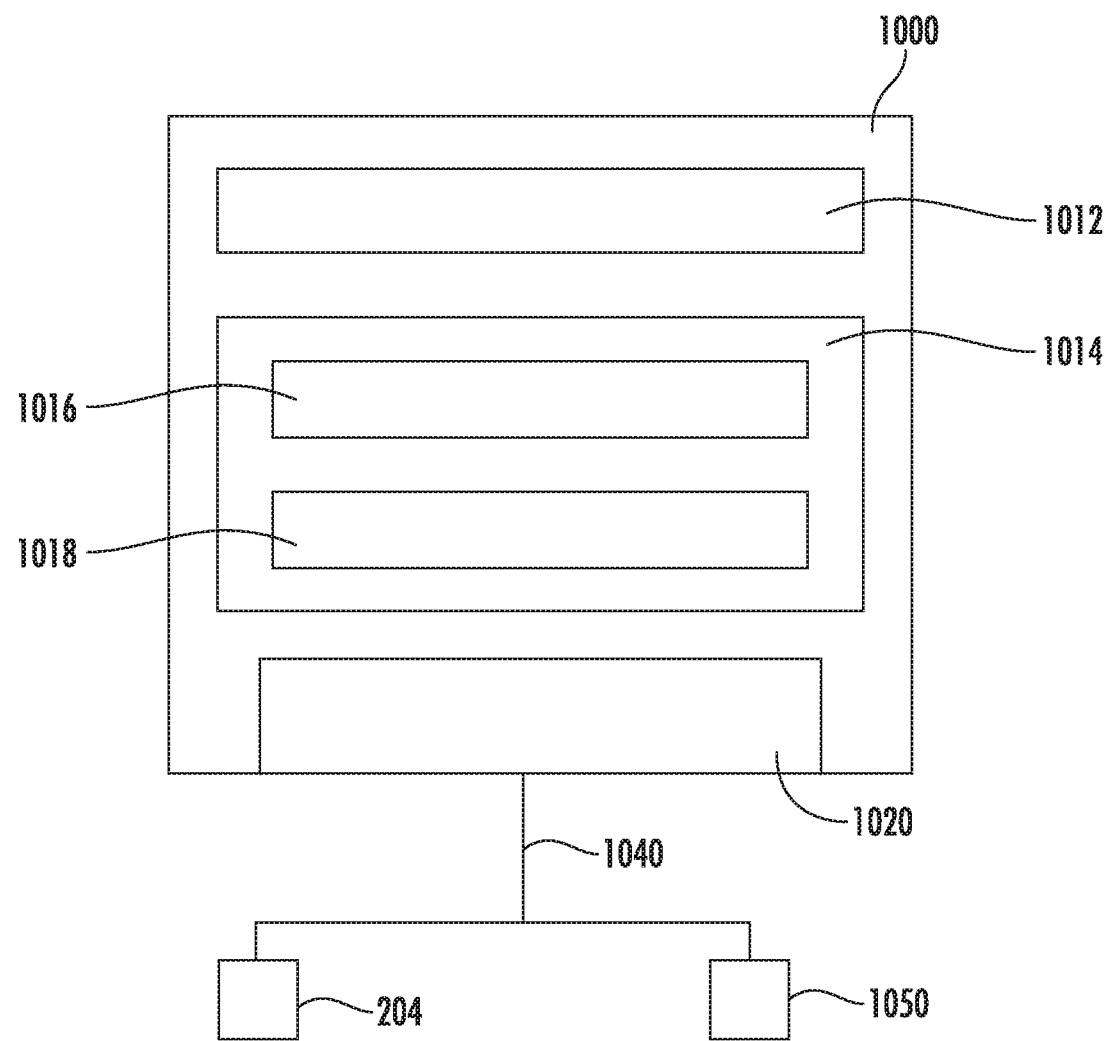
FIG. 10 depicts an example control device used in a control system according to example embodiments of the present disclosure.

In an example embodiment, front edge 116 can be moved in response to a signal from a control device, such as, for instance, control device 1000 depicted in FIG. 10. For example, in an embodiment, front edge 116 can be moved in response to a control signal sent to one or more actuators 118 that controls the one or more actuators 118 to move front edge 116 to a particular setpoint, such as the first, second, or intermediate positions. In this way, the amount of airflow and/or the speed of airflow that flows through engine airflow path 64 can be varied, thereby allowing the performance of annular inlet 20 to be varied to match the airflow demand of the LP compressor 22. In an embodiment, translating inlet assembly 112 can be controlled to move front edge 116 to move between the first, second, and intermediate positions to allow the performance of annular inlet 20 to be varied to adjust airflow distortion to improve the operability of gas turbine engine 10, or increase the stall margin of LP compressor 22. For example, in certain embodiments, adjusting the airflow distortion may include adjusting an inlet airflow distortion and/or adjusting an airflow mismatch and/or airflow speed mismatch between LP compressor 22 and HP compressor 24. Airflow and/or airflow speed mismatch can occur because fans, such as variable pitch fan 38 in gas turbine engine 10, may operate within a narrow speed range, which may be elevated. In such configurations, low pressure compressors, such as LP compressor 22, may operate at a similarly elevated speed because they are mechanically coupled to the variable pitch fan through a gearbox. In low power conditions, a low pressure compressor, such as LP compressor 22, may pump too much airflow for a high pressure compressor, such as HP compressor 24, to accept.

Figure 5:
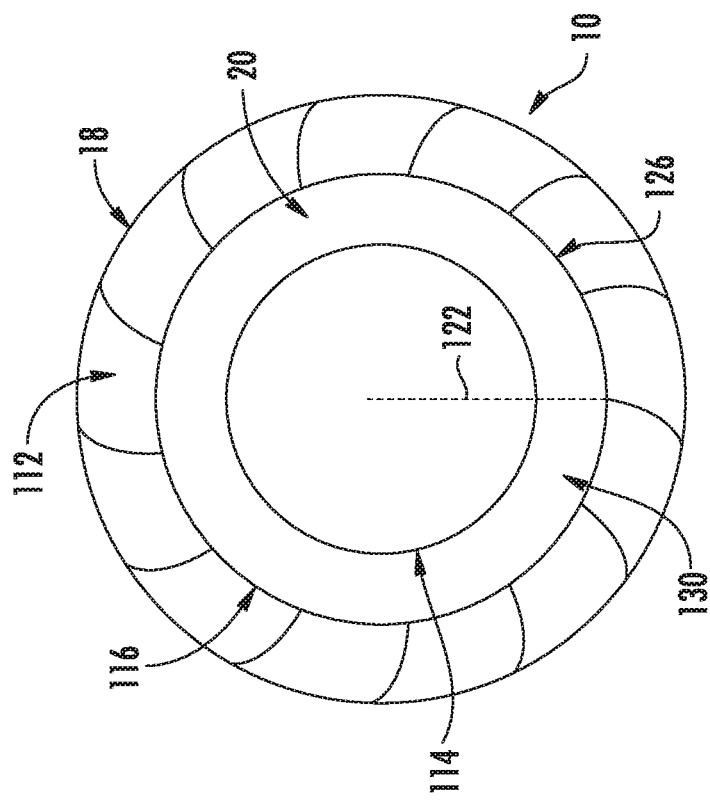
FIG. 5 is a schematic, axial view of a forward end of an example gas turbine engine according to example embodiments of the present disclosure.
Figure 4:
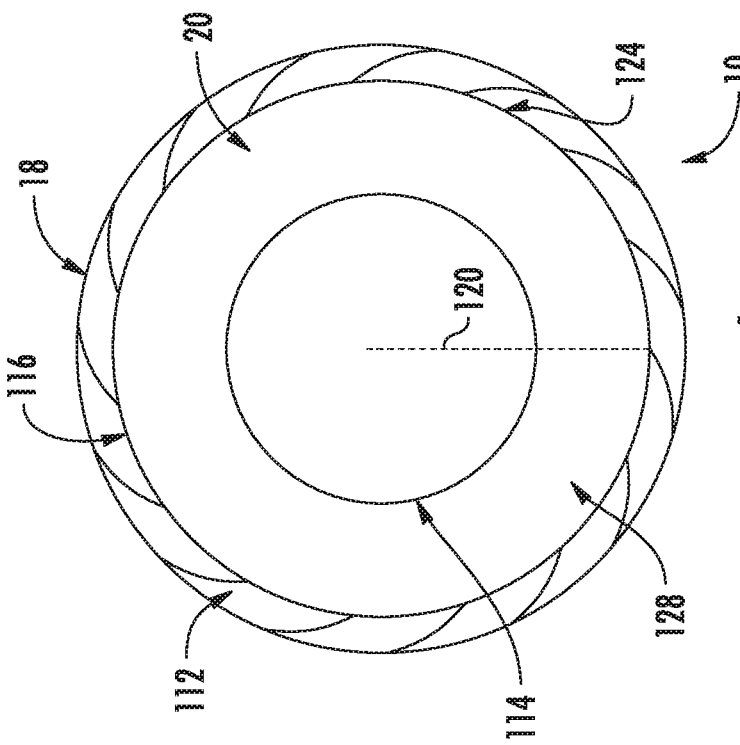
FIG. 4 is a schematic, axial view of a forward end of an example gas turbine engine according to example embodiments of the present disclosure.

Referring now to FIGS. 4 and 5, a schematic, axial view of the example forward end of an example gas turbine engine 10 depicted in FIGS. 2 and 3 is shown. As shown in FIGS. 4 and 5, gas turbine engine 10 includes outer casing 18. Outer casing 18 includes translating inlet assembly 112 on a forward end. Translating inlet assembly 112 can include a front edge 116. Gas turbine engine 10 can also include an inner flowpath surface 114. Together, front edge 116 and inner flowpath surface 114 can define annular inlet 20.

Front edge 116 can move between the first position, as depicted in FIG. 4, and the second position, as depicted in FIG. 5. In an embodiment, front edge 116 can move between the first position and the second position in a substantially uniform manner about the circumferential direction of the gas turbine engine 10. For example, as shown in FIGS. 4 and 5, front edge 116 can move between the first position and second position such that annular inlet 20 is generally uniform around the circumferential direction of the gas turbine engine 10. For example, front edge 116 could comprise a plurality of overlapping panels that can open or close to move between the first position and second position. Other embodiments of front edge 116 that are moveable between the first position and second position in a generally uniform manner about the circumferential direction of gas turbine engine 10 can be used without departing from the scope or spirit of the present disclosure. Additionally, in some embodiments, front edge 116 can move to the one or more intermediate positions in a substantially uniform manner about the circumferential direction of the gas turbine engine 10.

As depicted in FIG. 4, front edge 116 in the first position defines the first radius 120 and a first circumference 124. As depicted in FIG. 5, front edge 116 in the second position defines the second radius 122 and a second circumference 126. As depicted in FIGS. 4 and 5, first radius 120 is greater than second radius 122 and first circumference 124 is greater than second circumference 126. Further, as depicted in FIG. 4, front edge 116 and inner flowpath surface 114 together define a first area 128 of annular inlet 20. As depicted in FIG. 5, front edge 116 and inner flowpath surface 114 together define a second area 130 of annular inlet 20. As depicted in FIGS. 4 and 5, first area 128 is greater than second area 130. During operation of gas turbine engine 10, front edge 116 in the first position will allow an increased first portion of air 60 to enter annular inlet 20 as compared to the first portion of air 60 that can enter annular inlet 20 when front edge 116 is in the second position. Additionally and/or alternatively, front edge 116 in the first position will allow first portion of air 60 to enter annular inlet 20 at a first airflow speed and front edge 116 in the second position will allow the first portion of air 60 to enter annular inlet 20 at a second airflow speed. The airflow speed of the first portion of air 60 in the second position is greater than the airflow speed of the first portion of air 60 in the first position. In another embodiment not shown in FIGS. 4 and 5, front edge 116 can be adjusted to one or more intermediate positions such that the inlet area in the intermediate position is less than the first area 128 and greater than the second area 130. During operation of gas turbine engine 10, front edge 116 in the intermediate position will allow a first portion of air 60 to enter the engine airflow path 64 that is less than the first portion of air 60 in the first position and more than the first portion of air 60 in the second position. Additionally and/or alternatively, front edge 116 in the intermediate position will allow a first portion of air 60 to enter annular inlet 20 at an airflow speed that is less than the airflow speed of the first portion of air 60 in the second position and greater than the airflow speed of the first portion of air 60 in the first position.

Figure 6:
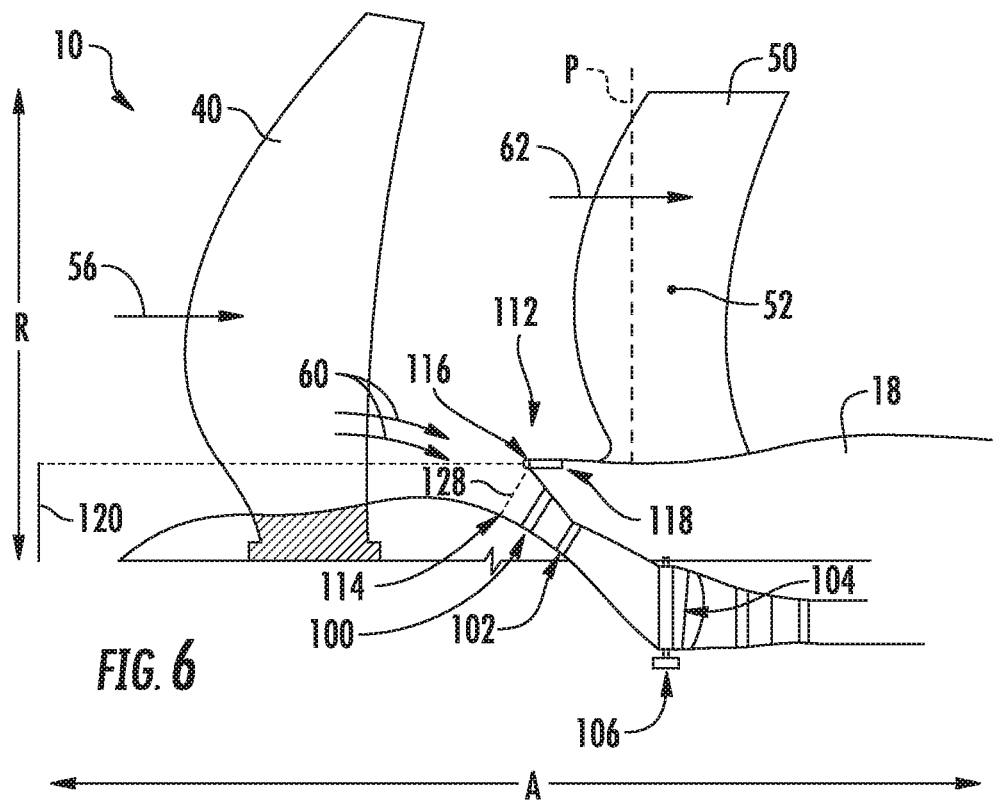
FIG. 6 is schematic, cross-sectional view of a forward end of an example gas turbine engine according to example embodiments of the present disclosure.
Figure 7:
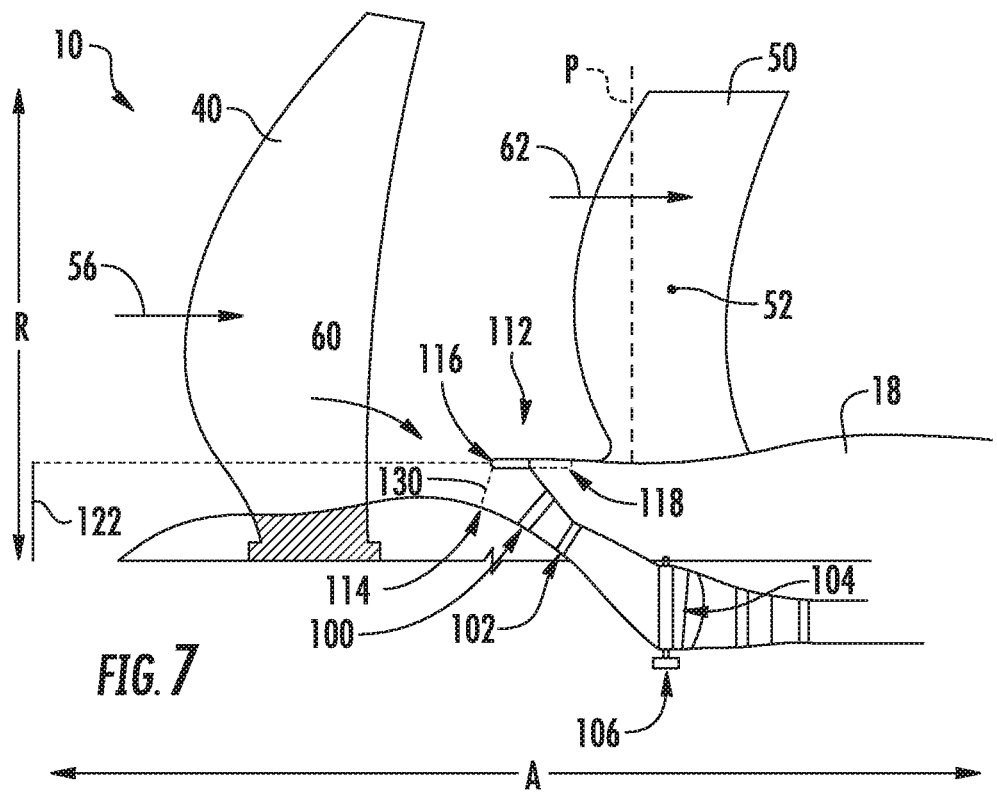
FIG. 7 is schematic, cross-sectional view of a forward end of an example gas turbine engine according to example embodiments of the present disclosure.

Referring now to FIGS. 6 and 7, the same forward end of gas turbine engine 10 depicted in FIGS. 2 and 3 is shown according to additional example aspects of the present disclosure. Structures that are the same or similar to those shown in FIGS. 2 and 3 are referred to with the same reference numerals.

As depicted in FIGS. 6 and 7, translating inlet assembly 112 is located on the forward end of outer casing 18. As shown in FIGS. 6 and 7, core engine 16 can include an inner flowpath surface 114. Translating inlet assembly 112 can include a front edge 116 which can be moved by one or more actuators 118. In an embodiment, a plurality of actuators 118 can be spaced about the circumferential direction of gas turbine engine 10 to move front edge 116. Together, front edge 116 and inner flowpath surface 114 can define annular inlet 20, as shown in FIG. 1.

As illustrated in FIGS. 6 and 7, in some embodiments, front edge 116 can be moved at least partially along axial direction A between a first position and a second position. For example, as shown in FIG. 6, front edge 116 is in a first position such that annular inlet 20 has a first inlet area 128. As shown in FIG. 7, front edge 116 is in a second position such that annular inlet 20 has a second inlet area 130. As shown in FIG. 6, front edge 116 is in a first position such that front edge 116 defines a first radius 120. As shown in FIG. 7, front edge 116 is in a second position such that front edge 116 defines a second radius 122. As depicted in FIGS. 6 and 7, first radius 120 and second radius 122 are equal. In another embodiment, first radius 120 can be different than second radius 122.

As depicted in FIGS. 6 and 7, first portion of air 60 enters core engine 16 by passing between front edge 116 and inner flowpath surface 114. As depicted in FIGS. 6 and 7, front edge 116 in the first position allows an increased first portion of air 60 to enter engine flowpath 64 as compared to front edge 116 in the second position. Additionally and/or alternatively, front edge 116 in the first position will allow first portion of air 60 at a first airflow speed and front edge 116 in the second position will allow the first portion of air 60 at a second airflow speed. The airflow speed of the first portion of air 60 in the second position is greater than the airflow speed of the first portion of air 60 in the first position. In another embodiment not shown in FIGS. 6 and 7, front edge 116 can be moved to one or more intermediate positions such that the first portion of air 60 in the intermediate position is less than the first portion of air 60 in the first position and more than the first portion of air 60 in the second position. Additionally and/or alternatively, front edge 116 in the intermediate position will allow a first portion of air 60 at an airflow speed that is less than the airflow speed of the first portion of air 60 in the second position and greater than the airflow speed of the first portion of air 60 in the first position.

In an embodiment, front edge 116 can move between the first position, second position, and intermediate position in a substantially uniform manner about the circumferential direction of the gas turbine engine 10. For example, front edge 116 can move along the axial direction between the first, second, and intermediate positions such that annular inlet 20 is generally uniform around the circumferential direction of the gas turbine engine 10. For example, front edge 116 could comprise a solid front edge configured to move along the axial direction A and maintain a fixed radius in the first, second, and intermediate positions. Other embodiments of front edge 116 that can move between the first, second, and intermediate positions in a generally uniform manner about the circumferential direction of gas turbine engine 10 can be used without departing from the scope or spirit of the present disclosure.

In an example embodiment, front edge 116 can be moved in response to a signal from a control device, such as, for instance, control device 1000 depicted in FIG. 10. For example, in an embodiment, front edge 116 can be moved in response to a control signal sent to one or more actuators 118 that controls the one or more actuators 118 to move front edge 116 to a particular setpoint, such as the first, second, or intermediate positions. In this way, the amount and/or speed of airflow that flows through engine airflow path 64 can be varied, and the performance of annular inlet 20 can be varied to match the airflow demand of the LP compressor 22. In an embodiment, translating inlet assembly 112 can be controlled to move front edge 116 to move between the first, second, and intermediate positions to allow an increased or decreased first portion of air 60 to flow into the engine airflow path 64 or an increased or decreased airflow speed of first portion of air 60 to adjust airflow distortion to improve the operability of gas turbine engine 10 or increase the stall margin of LP compressor 22. For example, in certain embodiments, adjusting the airflow distortion may include adjusting an inlet airflow distortion and/or adjusting an airflow or airflow speed mismatch between LP compressor 22 and HP compressor 24.

Referring generally to FIGS. 2-7, during operation of gas turbine engine 10, front edge 116 of translating inlet assembly 112 can be configured to be controlled to adjust airflow distortion in engine airflow path 64. For instance, a control device, such as control device 1000 shown in FIG. 10, can obtain measurements from one or more pressure sensor devices, and determine that an area of the engine airflow path is experiencing airflow distortion, such as airflow separation. The control device can then control translating inlet assembly 112 to adjust the airflow distortion, by, for example, sending a control signal to one or more actuators 118 to move front edge 116 between the first, second, and intermediate positions to increase or decrease the first portion of air 60 or to increase or decrease an airflow speed of first portion of air 60 flowing into the engine airflow path 64. In this way, airflow distortion in a gas turbine engine can be adjusted, and moreover, reduced, thereby improving operability of the gas turbine engine.

Figure 8:
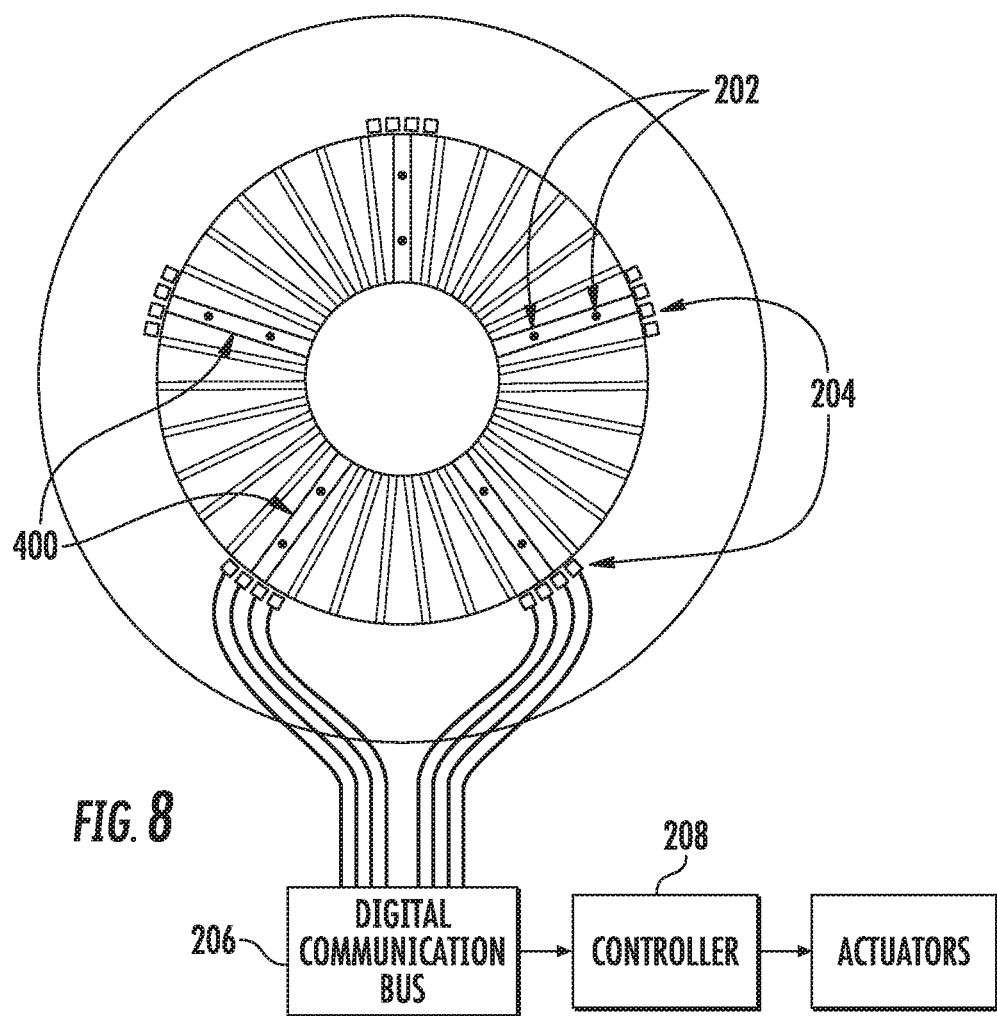
FIG. 8 is a schematic, axial view of an array of instrumented guide vanes in an example gas turbine engine according to example embodiments of the present disclosure.
Figure 9:
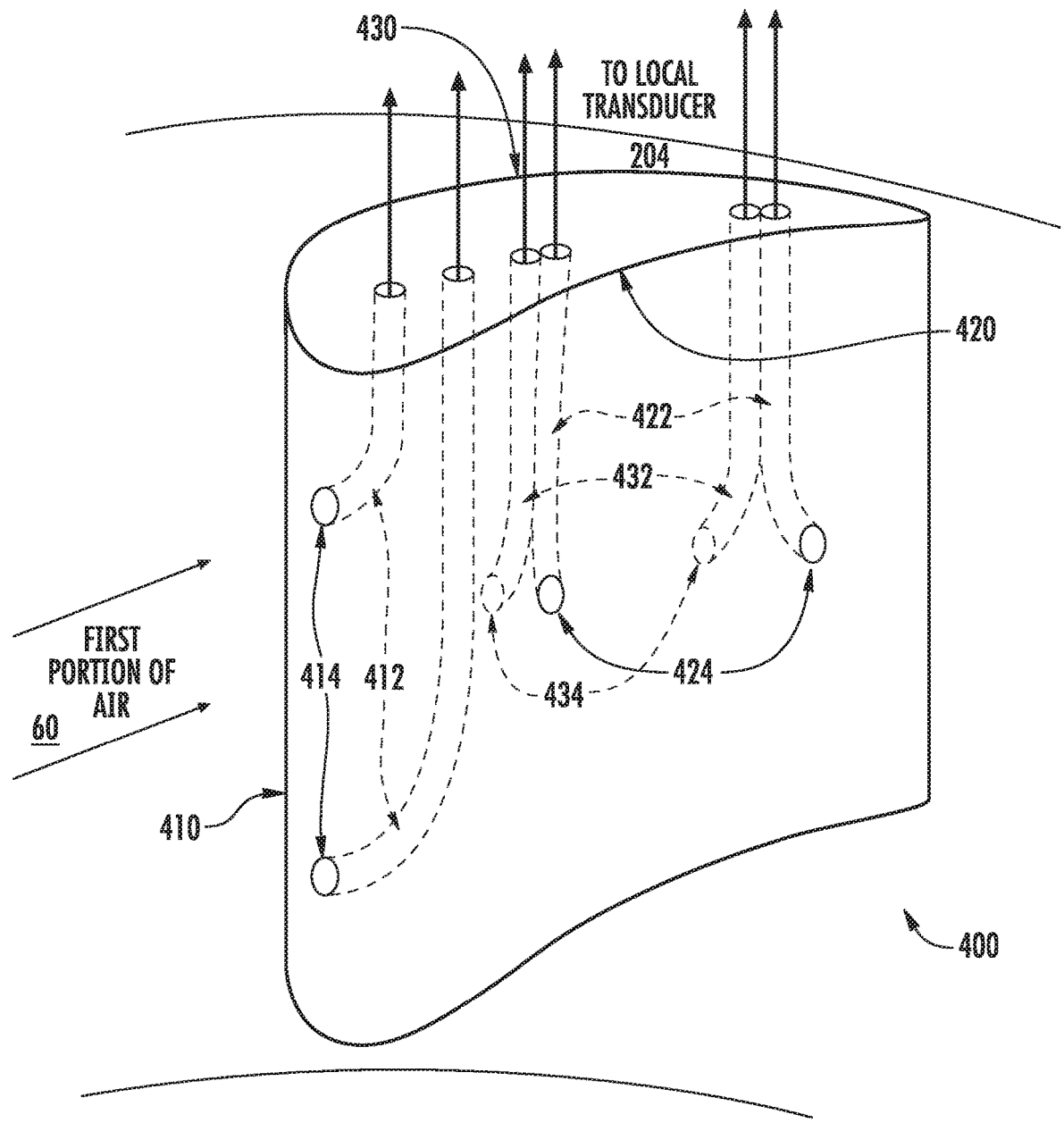
FIG. 9 is a schematic of an individual instrumented guide vane in an example gas turbine engine according to example embodiments of the present disclosure.

In one embodiment, one or more pressure sensor devices can be located at least partially within engine airflow path 64. In one embodiment, the one or more pressure sensor devices can be at least partially integrated into one or more members in the engine airflow path 64, such as an instrumented guide vane 400 as shown in FIGS. 8 and 9. In another embodiment, the one or more pressure sensor devices can be integrated into inlet guide vane 100 or strut 102. Other pressure sensor devices can also be used without departing from the scope or spirit of the present disclosure. Using measurements obtained by the one or more pressure sensor devices, an airflow distortion assessment can be determined.

Additionally, in another example embodiment, a plurality of pressure sensing devices can be spaced about the circumferential direction of gas turbine engine 10. For example, gas turbine engine 10 can include a plurality of instrumented guide vanes 400 spaced about the circumferential direction of gas turbine engine 10 as depicted in FIG. 8. Using measurements obtained by the pressure sensor devices, an airflow distortion assessment can be made. For example, a non-uniform pressure profile across the circumferential direction of the engine airflow path could indicate that airflow distortion is present in a particular area of engine airflow path 64. Additionally, the one or more pressure sensor devices can be used at least in part for determining an airflow and/or airflow speed mismatch between two compressors, such as an LP compressor 22 and HP compressor 24. One or more actuators 118 then be controlled to move front edge 116 of translating inlet assembly 112 to increase or decrease the first portion of air 60 flowing into engine airflow path 64, thereby adjusting, and further, reducing the airflow distortion.

Referring now to FIG. 8, a schematic, axial view of an array of individual guide vanes 104 in the example gas turbine engine 10 of FIG. 1 is shown. As shown, a plurality of individual guide vanes 104 are configured in a circumferential array located in the engine airflow path 64 upstream of the LP Compressor 22. As depicted in FIG. 8, five instrumented guide vanes 400, as discussed below in greater detail with respect to FIG. 9, are included in the array of individual guide vanes 104. As will be discussed in greater detail below with reference to FIG. 9, each individual instrumented guide vane 400 is configured with a pressure sensing device. As shown in FIG. 8, the pressure sensing device includes one or more taps 202 extending through the individual instrumented guide vane 400 and one or more local transducers 204 configured to measure an air pressure from the one or more taps 202. However, it will be apparent to those skilled in the art will that the pressure sensing device can be any suitable device configured to sense pressure without departing from the scope or spirit of the present disclosure. According to example aspects of the present disclosure, one or more pressure sensor devices, such as an array of instrumented guide vanes depicted in FIG. 8, can be used for obtaining one or more measurements to determine an airflow distortion condition in the engine airflow path, such as an inlet airflow distortion. Additional pressure sensor devices not depicted can also be used for obtaining measurements to determine other airflow distortion conditions, such as an airflow and/or airflow speed mismatch between two compressors, such as a LP compressor 22 and HP compressor 24 (see e.g., FIG. 1). As shown in FIG. 8, local transducer 204 is configured to send data indicative of an air pressure to a digital communication bus 206. Digital communication bus 206 then sends the data indicative of an air pressure to controller 208. In an embodiment, controller 208 can be a control device programmed to perform operations, such as control device 1000 depicted in FIG. 10. Controller 208 can control various actuators based on the data indicative of an air pressure, such as one or more actuators 118 of a translating inlet assembly 112.

FIG. 9 is a schematic of an individual instrumented guide vane 400 for an example gas turbine engine according to example embodiments of the present disclosure. Instrumented guide vane 400 can be a variable guide vane 104 or a stationary guide vane 100. As depicted in FIG. 9, instrumented guide vane 400 can be configured in a nonsymmetrical airfoil shape generally having a "tear drop" shape with a leading edge 410, a pressure side 420, and a suction side 430. However, in other example embodiments, the instrumented guide vane 400 may instead define any other suitable symmetrical or nonsymmetrical shape or configuration. In some implementations, leading edge 410 can be configured within engine airflow path 64 such that first portion of air 60 flowing downstream of annular inlet 20 first comes into contact with leading edge 410 before flowing over pressure side 420 and suction side 430 and continuing into LP compressor 22.

Referring still to FIG. 9, one or more leading edge taps 412, pressure side taps 422 and/or suction side taps 432 are integrated into instrumented guide vane 400. The leading edge taps 412, pressure side taps 422, and suction side taps 432 are depicted in phantom. As depicted in FIG. 9, two leading edge inlets 414 are spaced radially along leading edge 410 to allow air from an engine airflow, such as first portion of air 60, to enter leading edge inlet 414 and flow through leading edge tap 412 to a local transducer 204 (not shown in FIG. 9). In another embodiment, a single leading edge inlet 414 and leading edge tap 412 can be integrated into leading edge 410. In another embodiment three or more leading edge inlets 414 and leading edge taps 412 can be integrated into leading edge 410.

Referring still to FIG. 9, two pressure side inlets 424 are spaced axially along pressure side 420 to allow an engine airflow, such as air from first portion of air 60, to enter pressure side inlet 424 and flow through pressure side tap 422 to a local transducer 204 (not shown in FIG. 9). In another embodiment, a single pressure side inlet 424 and pressure side tap 422 are integrated into pressure side 420. In another embodiment three or more pressure side inlets 424 and pressure side taps 422 are integrated into pressure side 420.

Referring still to FIG. 9, two suction side inlets 434 are spaced axially along suction side 430 to allow air from an engine airflow, such as first portion of air 60, to enter suction side inlet 434 and flow through suction side tap 432 to a local transducer 204 (not shown in FIG. 9). The suction side inlets 434 are depicted in phantom. In another embodiment a single suction side inlet 434 and suction side tap 432 are integrated into suction side 430. In another embodiment, three or more suction side inlets 434 and suction side taps 432 are integrated into suction side 430.

Referring still to FIG. 9, in an embodiment, local transducer 204 (not shown) can be configured to provide measurements of a pressure differential between a pressure side tap 422 and a suction side tap 432. In another embodiment, local transducer 204 (not shown) can be configured to provide measurements of absolute pressures from a pressure side tap 422 and a suction side tap 432.

FIG. 10 depicts an example control device used in a control system according to example embodiments of the present disclosure. As shown, the control device(s) 1000 can include one or more processors 1012 and one or more memory devices 1014. The one or more processors 1012 can include any suitable processing device, such as a microprocessor, microcontroller, integrated circuit, logic device, or other suitable processing device. The one or more memory devices 1014 can include one or more computer-readable media, including, but not limited to, non-transitory computer-readable media, RAM, ROM, hard drives, flash drives, or other memory devices.

The one or more memory devices 1014 can store information accessible by the one or more processors 1012, including computer-readable instructions 1016 that can be executed by the one or more processors 1012. The instructions 1016 can be any set of instructions that when executed by the one or more processors 1012, cause the one or more processors 1012 to perform operations. The instructions 1016 can be implemented in software written in any suitable programming language or can be implemented in hardware. In some embodiments, the instructions 1016 can be executed by the one or more processors 1012 to cause the one or more processors 1012 to perform operations, such as the operations for controlling a translating inlet assembly to adjust airflow distortion in a gas turbine engine as described with reference to FIG. 11.

Referring to FIG. 10, the memory devices 1014 can further store data 1018 that can be accessed by the processors 1012. The data 1018 can include, for instance, operating parameters, pressure measurements obtained from the engine airflow path, and other data. The data 1018 can also include data associated with models and algorithms used to perform the example methods according to example aspects of the present disclosure, such as models and algorithms for determining a distortion condition.

The control device(s) 1000 can further include a communications interface 1020. The communications interface 1020 can be configured to communicate with aircraft systems over a communication network 1040. For instance, the communications interface 1020 can receive data indicative of a pressure obtained by a pressure sensing device, such as a tap 202 and local transducer 204. In one embodiment, the communications interface 1020 can provide control commands to an engine control system 1050 that has one or more actuators to control various components of the gas turbine engine 10, such as, but not limited to, an actuator 118 of a translating inlet assembly 112. The communications interface 1020 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 11:
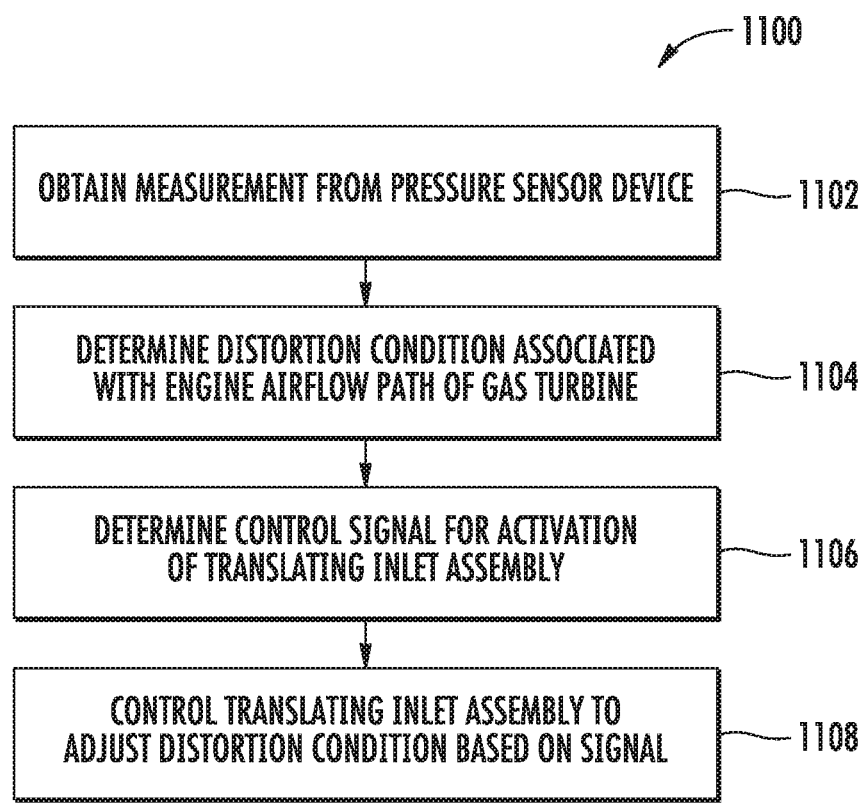
FIG. 11 depicts a flow diagram of an example method according to example embodiments of the present disclosure.

Referring now to FIG. 11, a flow diagram of an example method (1100) according to example embodiments of the present disclosure is depicted. FIG. 11 can be implemented by one or more control devices, such as the control device 1000 depicted in FIG. 10. In addition, FIG. 11 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (1102), the method can include obtaining one or more measurements from one or more pressure sensor devices. The one or more measurements can be obtained by, for example, a local transducer 204 operatively connected to an instrumented guide vane 400 as shown in FIGS. 8 and 9. Alternatively, the one or more measurements can be obtained from any other suitable pressure sensor device.

At (1104), the method can include determining a distortion condition associated with the engine airflow path of a gas turbine engine from the one or more measurements. For example, using the one or more measurements, a distortion condition can be determined, such as a local flow disruption in the engine airflow path 64 of the gas turbine engine 10 that causes portions of the LP compressor 22 to be at or below pressures sufficient to cause stall conditions.

At (1106), the method can include determining a control signal for activation of a translating inlet assembly based at least in part on the distortion condition assessment. For example, a set point can be determined for a translating inlet assembly 112 to increase the airflow through the translating inlet assembly 112 in order to energize an area of the engine airflow path 64 that is experiencing a local flow disruption. A control signal representing the determined set point of the translating inlet assembly 112 can then be sent to one or more actuators 118 in order to adjust the translating inlet assembly 112.

At (1108), the method can include controlling the translating inlet assembly 112 to adjust the distortion condition based on the control signal. For example, one or more actuators 122 can move front edge 116 of translating inlet assembly 112 based on the control signal. The translating inlet assembly 112 can be then controlled to move to the determined set point to adjust the airflow distortion. In this way, a translating inlet assembly 112 can adjust the airflow distortion associated with the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A core engine for a gas turbine engine, comprising:
a compressor section, a combustion section, and a turbine section defining at least in part an engine airflow path for the core engine;
an inner flowpath surface positioned at least partially within the compressor section and defining at least in part the engine airflow path;
a core casing at least partially enclosing the compressor section and defining a forward end, the core casing comprising a moving inlet assembly at the forward end, the moving inlet assembly and inner flowpath surface together defining an inlet to the compressor section, the moving inlet assembly moveable between a first position defining a first inlet area at the inlet and a second position defining a second inlet area at the inlet, the first inlet area being greater than the second inlet area,
wherein the core engine defines a centerline axis,
wherein the moving inlet assembly is movable between the first position and the second position in a substantially uniform manner about the centerline axis of the core engine; and
an instrumented guide vane comprising one or more pressure sensor devices located at least partially in the engine airflow path for obtaining one or more measurements associated with airflow distortion,
wherein the moving inlet assembly is configured to be controlled based at least in part on signals from the one or more pressure sensor devices,
wherein the moving inlet assembly defines a leading edge of the core casing, wherein the leading edge defines a first circumference in the first position, wherein the leading edge defines a second circumference in the second position, and wherein the second circumference is less than the first circumference.

2. The core engine of claim 1, wherein the moving inlet assembly allows a first engine airflow at a first airflow speed into the engine airflow path in the first position, wherein the moving inlet assembly allows a second engine airflow at a second airflow speed into the engine airflow path in the second position, wherein at least one of the first engine airflow is greater than the second engine airflow or the first engine airflow speed is less than the second engine airflow speed.

3. The core engine of claim 1, wherein the moving inlet assembly is configured to be controlled based on the airflow distortion in the engine airflow path, and wherein the airflow distortion is an inlet airflow distortion.

4. The core engine of claim 1, wherein the compressor section includes a first compressor and a second compressor, wherein the moving inlet assembly is configured to be controlled based on the airflow distortion in the engine airflow path, and wherein the airflow distortion is an airflow mismatch between the first and second compressors.

5. The core engine of claim 1, wherein the moving inlet assembly is additionally movable to an intermediate position, wherein the intermediate position defines an intermediate inlet area, wherein the intermediate inlet area is less than the first inlet area and greater than the second inlet area.

6. The core engine of claim 5, wherein the moving inlet assembly is movable between the first, second, and intermediate positions based on signals from a controller to adjust the airflow distortion in the engine airflow path.

7. A method for adjusting airflow distortion in a gas turbine engine on an aircraft, the gas turbine engine comprising a compressor section, a combustion section, and a turbine section in series flow, the compressor section, combustion section, and turbine section defining at least in part an engine airflow path, the gas turbine engine further comprising an inner flow path surface positioned at least partially within the compressor section and defining at least in part the engine airflow path, the gas turbine engine further comprising a core casing at least partially enclosing the compressor section and defining a forward end, the method comprising:

determining, by one or more control devices, an airflow distortion condition associated with the engine airflow path, the airflow distortion condition determined at least in part from one or more measurements obtained by an instrumented guide vane; and controlling, by the one or more control devices, a moving inlet assembly to adjust the airflow distortion condition of the gas turbine engine having been determined at least in part from the one or more measurements obtained by the instrumented guide vane, wherein the core casing comprises the moving inlet assembly at the forward end, the moving inlet assembly and inner flow path surface together defining an inlet to the compressor section, the moving inlet assembly moveable between a first position defining a first inlet area and a second position defining a second inlet area, the first inlet area being greater than the second inlet area, wherein the core engine defines a centerline axis, wherein the moving inlet assembly is movable between the first position and the second position in a substantially uniform manner about the centerline axis of the core engine, wherein the moving inlet assembly defines a leading edge of the core casing, wherein the leading edge defines a first circumference in the first position, wherein the leading edge defines a second circumference in the second position, and wherein the second circumference is less than the first circumference.

8. The method of claim 7, wherein the moving inlet assembly is additionally movable to an intermediate position, wherein the intermediate position defines an intermediate inlet area, wherein the intermediate inlet area is less than the first inlet area and greater than the second inlet area.

9. The method of claim 8, wherein the moving inlet assembly allows a first engine airflow into the engine airflow path in the first position, wherein the moving inlet assembly allows a second engine airflow into the engine airflow path in the second position, wherein the moving inlet assembly allows an intermediate engine airflow into the engine airflow path in the intermediate position, wherein the intermediate engine airflow is less than the first engine airflow and greater than the second engine airflow.

10. The method of claim 8, wherein controlling the moving inlet assembly comprises moving the moving inlet assembly between the first, second, and intermediate positions.

11. The method of claim 9, wherein controlling the moving inlet assembly to adjust the airflow distortion condition comprises controlling the moving inlet assembly to reduce the airflow distortion condition.

12. The method of claim 7, wherein determining the airflow distortion condition associated with the engine airflow path comprises obtaining the one or more measurements using one or more pressure sensor devices, wherein controlling the moving inlet assembly to adjust the airflow distortion condition comprises controlling the moving inlet assembly based at least in part on the one or more measurements obtained using the one or more pressure sensor devices.

13. A gas turbine engine system for an aircraft comprising:

a compressor section, a combustion section, and a turbine section defining at least in part an engine airflow path for a core engine;

an inner flowpath surface positioned at least partially within the compressor section and defining at least in part the engine airflow path;

a core casing at least partially enclosing the compressor section and defining a forward end, the core casing comprising a moving inlet assembly at the forward end, the moving inlet assembly and inner flowpath surface together defining an inlet to the compressor section, the moving inlet assembly moveable between a first position defining a first inlet area at the inlet and a second position defining a second inlet area at the inlet, the first inlet area being greater than the second inlet area, wherein the core engine defines a centerline axis, wherein the moving inlet assembly is movable between the first position and the second position in a substantially uniform manner about the centerline axis of the core engine; and a controller operably connected to the moving inlet assembly, the controller comprising one or more processors and one or more memory devices located on the aircraft, the one or more memory devices storing instructions that when executed by the one or more processors cause the one or more processors to perform operations, the operations comprising:

determine an airflow distortion condition within the engine airflow path; and control the moving inlet assembly to adjust an airflow through the engine airflow path to adjust the airflow distortion condition, wherein the moving inlet assembly defines a leading edge of the core casing, wherein the leading edge defines a first circumference in the first position, wherein the leading edge defines a second circumference in the second position, and wherein the second circumference is less than the first circumference.

14. The gas turbine engine system of claim 13, wherein the core engine comprises one or more pressure sensor devices located at least partially in the engine airflow path configured to obtain measurements to determine the airflow distortion condition, wherein the moving inlet assembly is controlled by the controller based at least in part on the measurements obtained by the one or more pressure sensor devices.

15. The gas turbine engine system of claim 13, wherein the moving inlet assembly is additionally movable to an intermediate position, wherein the intermediate position defines an intermediate inlet area, wherein the intermediate inlet area is less than the first inlet area and greater than the second inlet area.

16. The gas turbine engine system of claim 13, wherein controlling the moving inlet assembly comprises moving the moving inlet assembly between the first position, the second position, and intermediate positions.

\* \* \* \* \*